(12) United States Patent
Dohi (10) Patent No.: US 10,019,600 B2
(45) Date of Patent: Jul. 10, 2018

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Makoto Dohi, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 15/081,501

(22) Filed: Mar. 25, 2016

(65) Prior Publication Data

US 2016/0292438 A1 Oct. 6, 2016

(30) Foreign Application Priority Data

Mar. 30, 2015 (JP) ................................. 2015-067937

(51) Int. Cl.
```
G06F 21/62      (2013.01)
G06F 8/65       (2018.01)
H04L 29/06      (2006.01)
G06F 21/60      (2013.01)
H04N 1/44       (2006.01)
```

(52) U.S. Cl.
CPC .............. G06F 21/629 (2013.01); G06F 8/65 (2013.01); G06F 21/608 (2013.01); H04L 63/083 (2013.01); H04L 63/101 (2013.01); H04N 1/4433 (2013.01)

(58) Field of Classification Search
CPC .................................................. H04L 63/083
See application file for complete search history.

(56) References Cited

U.S. PATENT DOCUMENTS

| | | | | |
|---|---|---|---|---|
| 5,572,652 A | * | 11/1996 | Robusto | G06F 9/4443 714/E11.188 |
| 6,122,746 A | * | 9/2000 | Nouri | G06F 1/20 709/203 |
| 2003/0093563 A1 | * | 5/2003 | Young | H04L 12/4633 709/245 |
| 2008/0052702 A1 | * | 2/2008 | Chuang | G06F 8/65 717/170 |
| 2008/0086652 A1 | * | 4/2008 | Krieger | G06F 1/26 713/330 |
| 2010/0005462 A1 | * | 1/2010 | Ookuma | G06F 8/65 717/177 |
| 2011/0320911 A1 | * | 12/2011 | Fry | G06F 11/1048 714/758 |
| 2014/0115572 A1 | * | 4/2014 | Michishita | G06F 8/65 717/168 |

FOREIGN PATENT DOCUMENTS

JP 2008-46708 A 2/2008

* cited by examiner

*Primary Examiner* — Morshed Mehedi
(74) *Attorney, Agent, or Firm* — Canon USA, Inc. I.P. Division (57) ABSTRACT

An information processing apparatus includes an update unit configured to update firmware of the information processing apparatus, a determination unit configured to determine whether use of a particular function that is provided by the information processing apparatus is restricted due to the firmware being updated by the update unit, and a display unit configured to provide a warning display if the determination unit determines that the use of the particular function is restricted.

4 Claims, 9 Drawing Sheets

700 CONVENTIONAL LOGIN SCREEN FOR RUI

○ ADMINISTRATOR MODE

SYSTEM MANAGEMENT ID [ ]

SYSTEM MANAGEMENT PASSWORD [ ]

● GENERAL USER MODE

USER NAME [ ]

GENERAL USERS CAN LOG IN WITHOUT ENTERING USER NAME.

[ LOGIN ]

710 LOGIN SCREEN FOR RUI AVAILABLE FOR REMOTE ACCESS PASSWORD

○ ADMINISTRATOR MODE

SYSTEM MANAGEMENT ID [ ]

SYSTEM MANAGEMENT PASSWORD [ ]

● GENERAL USER MODE

USER NAME [ ]

GENERAL USERS CAN LOG IN WITHOUT ENTERING USER NAME.

REMOTE ACCESS PASSWORD [ ]

[ LOGIN ]

FIG.8

*800* REMOTE ACCESS PASSWORD
SETTING WIZARD SCREEN 1

IN THE CASE OF USING REMOTE UI,
TO PREVENT UNAUTHORIZED ACCESS FROM THIRD PARTIES,
SETTING OF REMOTE ACCESS PASSWORD IS RECOMMENDED.
DO YOU WANT TO PERFORM SETTING?

| NO | YES |

*810* REMOTE ACCESS PASSWORD
SETTING WIZARD SCREEN 2

SETTING OF REMOTE ACCESS PASSWORD

[ ENTER ]

*820* REMOTE ACCESS PASSWORD
SETTING WIZARD SCREEN 3

REMOTE ACCESS PASSWORD (CONFIRMATION ENTRY)

[ ENTER ]

*830* REMOTE ACCESS PASSWORD
SETTING WIZARD SCREEN 4

SETTING OF REMOTE ACCESS PASSWORD WILL BE ENDED.

| BACK | NEXT |

*840* REMOTE ACCESS PASSWORD
SETTING WIZARD SCREEN 5

PASSWORDS ARE NOT IDENTICAL.
PLEASE REENTER PASSWORD.

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

Aspects of the present invention generally relate to an information processing apparatus, a control method for the information processing apparatus, and a storage medium.

Description of the Related Art

In cases where the user conventionally updates a control program for an information processing apparatus, such as an image processing apparatus, in the market, the user receives an update control program from a higher-level device, such as a server, and temporarily stores the update control program in the image processing apparatus.

Then, when receiving an instruction from the higher-level device, the image processing apparatus performs processing for rewriting the existing control program with the update control program and reports a result of the updating processing to the higher-level device.

In this case, since the control program is updated according to an instruction from the higher-level device and a result of updating of the control program is reported to the higher-level device, the control program can be surely updated (Japanese Patent. Application Laid-Open No. 2008-46708).

For example, a multifunction printer (MFP) has the capability to allow a client device, such as a personal computer (PC), connected to the MFP via a network to view and alter settings of the MFP using a web browser. This capability is referred to as a remote user interface (RUI).

For example, the client device can view and alter, via the RUI, an address book, in which transmission destinations for facsimile or e-mail are registered, and other databases, which are stored inside the MFP.

However, with regard to MFPs, since both manufacturers of MFPs and user of MFPs have little awareness that MFPs are information technology (IT) equipment, MFPs are often installed in the environment that is readily accessible from any outside (external network) such as the Internet.

In that case, depending on settings performed by the system administrator of an MFP or login settings performed by a user, the RUI may cause such a security problem that personal data registered in the address book or other databases becomes fully exposed to view.

SUMMARY OF THE INVENTION

Aspects of the present invention are generally directed to providing a scheme capable of expressly informing a user that a restriction is imposed on use of a particular function in response to updating of particular firmware, thus prompting the user to deal with the imposed restriction.

According to an aspect of the present invention, an information processing apparatus includes an update unit configured to update firmware of the information processing apparatus, a determination unit configured to determine whether use of a particular function that is provided by the information processing apparatus is restricted due to the firmware being updated by the update unit, and a display unit configured to provide a warning display if the determination unit determines that the use of the particular function is restricted.

According to an exemplary embodiment of the present invention, an information processing apparatus can promptly expressly inform a user that a restriction is imposed on use of a particular function in response to updating of particular firmware, thus prompting the user to deal with the imposed restriction.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Configuration of System>

Figure 1:
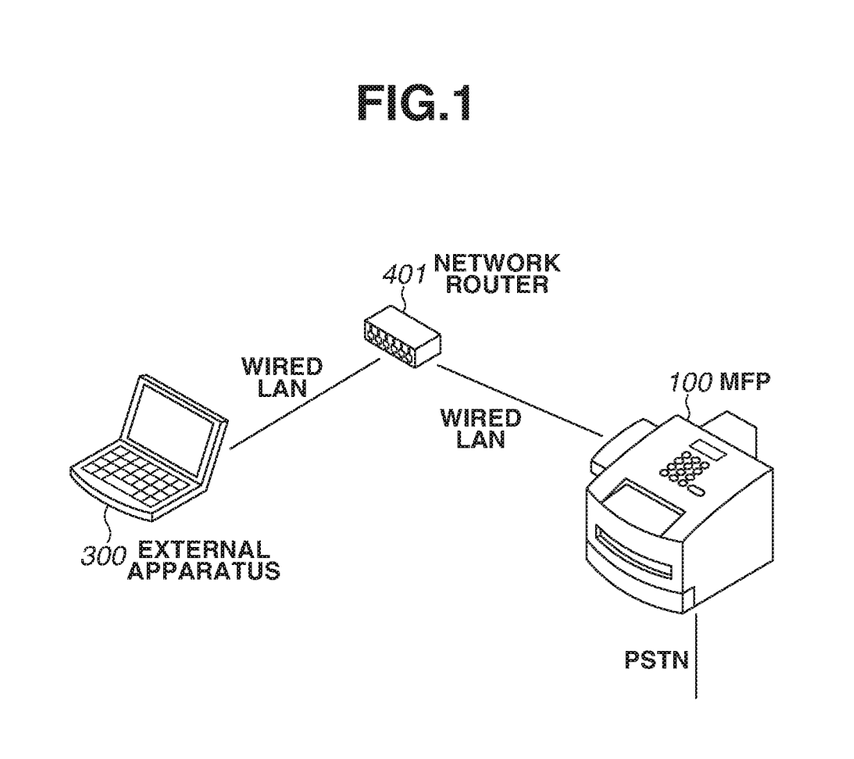
FIG. 1 illustrates a configuration of a system including an information processing apparatus and a management apparatus.

FIG. 1 illustrates a configuration of a system including an information processing apparatus and a management apparatus according to a first exemplary embodiment of the present invention. In an example of the configuration of the system illustrated in FIG. 1, an external apparatus 300 such as a PC, which is an example of the management apparatus, and an MET 100, which is an example of the information processing apparatus, are interconnected via a wired local area network (LAN). Furthermore, the MFP 100 is configured to be capable of acquiring print information from a data processing apparatus (not illustrated) via a wired LAN or a wireless LAN and performing print processing based on the print information. Moreover, the MFP 100 provides, to the data processing apparatus, an operation screen (a remote UI) of the MFP 100 according to a request from the data processing apparatus.

Referring to FIG. 1, the external apparatus 300, such as a PC, and the MFP 100 are interconnected by a wired LAN via a network router 401. Moreover, the external apparatus 300, such as a PC, and the MFP 100 may be interconnected by a network, such as a wireless LAN.

An update control program for the MFP 100, which is supplied from an application that is executed by the external apparatus 300, such as a PC, is transferred to the MFP 100 by the wired LAN via the network router 401.

Incidentally, since the application that is executed by the external apparatus 300, such as a PC, does not affect the effect of the present invention, the detailed description thereof is omitted.

Figure 2:
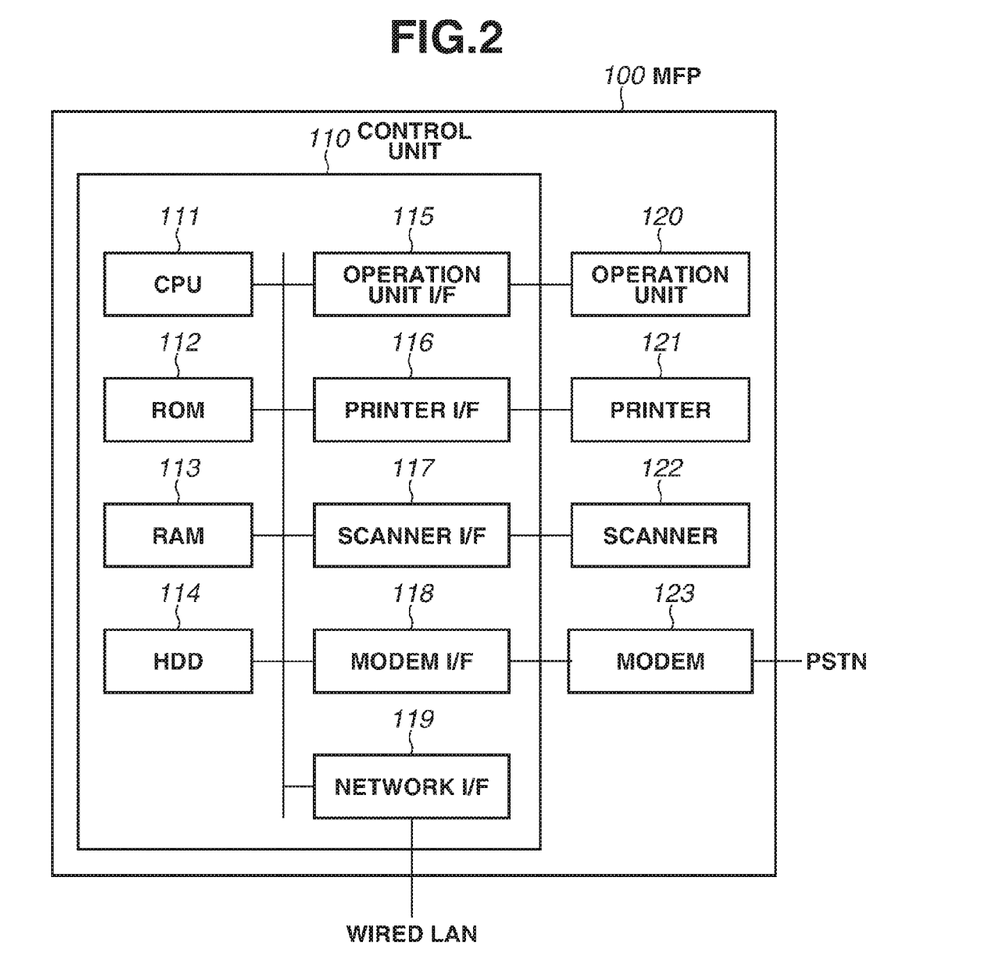
FIG. 2 is a block diagram illustrating a configuration of the information processing apparatus.

FIG. 2 is a block diagram illustrating a configuration of the information processing apparatus according to the present exemplary embodiment. The present exemplary embodiment is described with the MFP 100 used as an example of the information processing apparatus.

Referring to FIG. 2, a control unit 110, which includes a central processing unit (CPU) 111, controls the operation of the entire MFP 100. The CPU 111 reads out control programs stored in a read-only memory (ROM) 112 and performs various control operations for scanning, printing, transmission, and other functions. The ROM 112 is a nonvolatile memory, such as flash memory, which is able to retain recorded data without backup from any battery and is also able to freely perform overwriting of data.

However, the ROM 112 differs from a random access memory (RAM) 113 in intended use, and is, therefore, named as ROM. The RAN 113 is used as a temporary storage region, such as a main memory or a work area, for the CPU 111.

Furthermore, the MFP 100 is configured in such a manner that a single CPU 111 performs each processing illustrated in the flowcharts described below using a single memory (the RAM 113 or a hard disk drive (HDD) 114), but may be configured in other manners. For example, the MFP 100 may be configured in such a manner that a plurality of CPUs and a plurality of RAMs or HDDs perform each processing illustrated in the flowcharts described below in cooperation with each other.

The HDD 114 stores image data and various programs. An operation unit interface (I/F) 115 connects an operation unit 120 to the control unit 110. The operation unit 120 is equipped with a liquid crystal display unit having a touch panel function and a keyboard, and serves as a reception unit that receives an operation, an input, and an instruction from the user. A printer I/F 116 connects a printer 121 to the control unit 110. Image data to be printed by the printer 121 is transferred from the control unit 110 to the printer 121 via the printer I/F 116, and is then printed on a recording medium 121 by the printer 121.

A scanner I/F 117 connects a scanner 122 to the control unit 110. The scanner 122 reads an image on a document to generate image data, and then inputs the image data to the control unit 110 via the scanner I/F 117.

A modem I/F 118 connects a modem 123 to the control unit 110. The modem 123, which is connected to a public switched telephone network (PSTN), performs facsimile communications of image data between the MFP 100 and a facsimile apparatus (not illustrated).

A network I/F 119 connects the control unit 110 (the MFP 100) to a wired LAN. The MFP 100 is able to receive an update control program, which is executed using the ROM 112, from an external apparatus via the network I/F 119, and to transmit and receive image data and various pieces of information, to and from an external apparatus via the network I/F 119. Furthermore, an update control program, which is executed using the ROM 112, may be received from an external apparatus using another I/F, such as a universal serial bus (USB) flash memory (not illustrated), without affecting the effect of the present invention.

Figure 3:
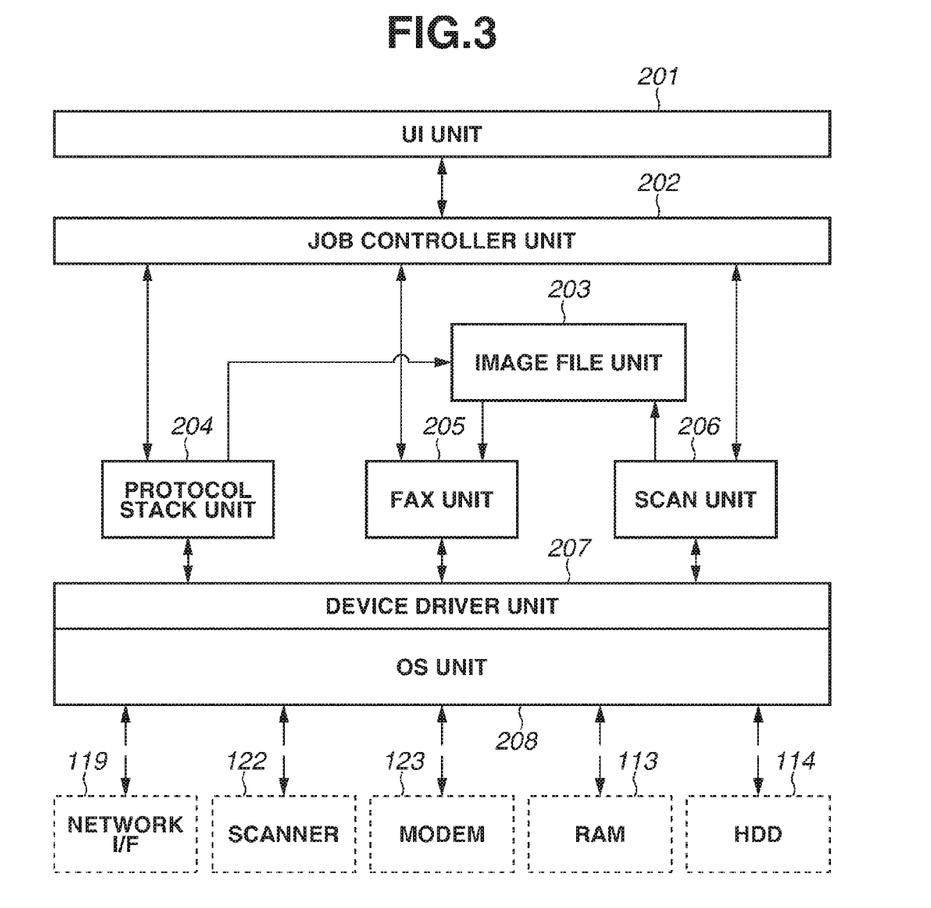
FIG. 3 is a block diagram illustrating a software configuration of a multifunction printer (MFP).
Figure 4:
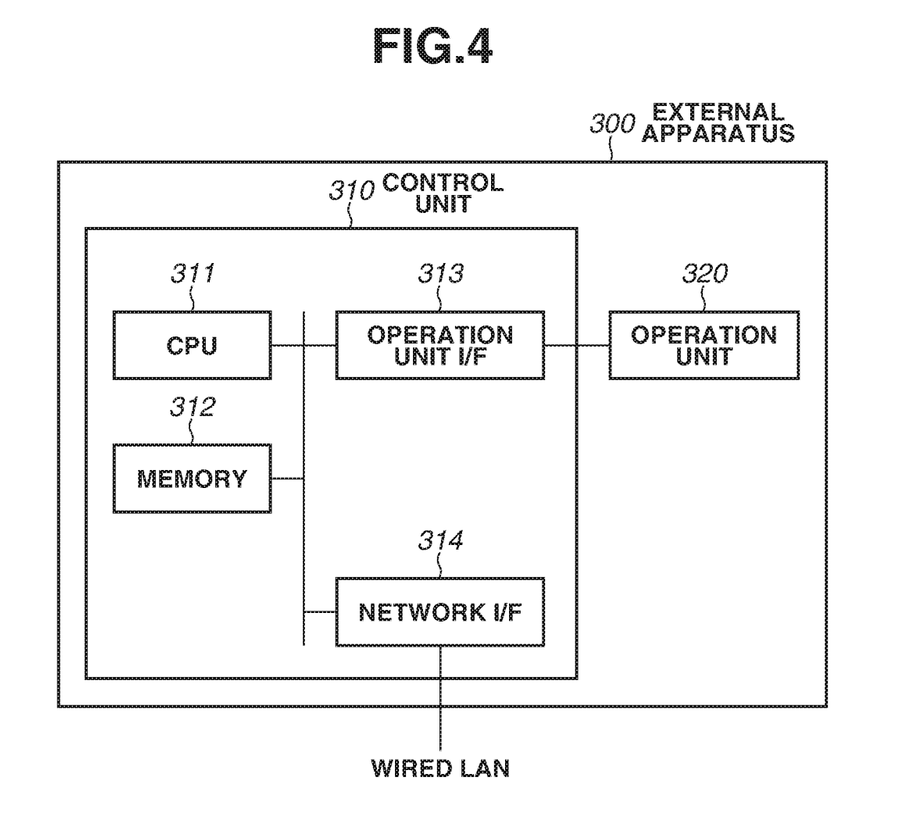
FIG. 4 is a block diagram illustrating a configuration of an external apparatus.

FIG. 3 is a block diagram illustrating a software configuration of the MFP 100 illustrated in FIG. 2. FIG. 4 is a block diagram illustrating a hardware configuration of the external apparatus 300 illustrated in FIG. 1.

Furthermore, each unit depicted with a solid-line block in FIG. 3 is a software module that is implemented by the CPU 111 reading out and executing programs stored in the ROM 112 or the HDD 114.

A user interface (UI) unit 201 provides various pieces of information to the user via the operation unit 120 and receives various instructions from the user. A job controller unit 202 receives a job for copy, print, or facsimile and controls execution of the received job. A protocol stack unit 204 retains various network protocols, such as Transmission Control Protocol/Internet Protocol (TCP/IP) and HyperText Transfer Protocol (HTTP).

In the present exemplary embodiment, the MFP 100 receives, from the external apparatus 300 (see FIG. 4), such as a PC, via the network I/F 119, image data, address data, and an update control program, which is executed using the ROM 112. In this instance, the MFP 100 operates according to the network protocols retained in the protocol stack unit 204.

Image data received, from the external apparatus 300 is stored by an image file unit 203. The image file unit 203 is a software module that manages image data stored in the RAM 113 or the HDD 114. The image file unit 203 stores not only image data received via the network I/F 119 but also image data generated by the scanner 122. The generation of data by the scanner 122 is controlled by a scan unit 206.

Similarly, address data received via the network I/F 119 and an update control program, which is executed using the ROM 112, are stored in the RAM 113 or the HDD 114. A fax unit 205 controls facsimile communication, which is performed via the modem 123.

When facsimile transmission from the MFP 100 is performed, the fax unit 205 reads out image data stored in the image file unit 203 and transmits the image data to an address stored in the RAM 113 or the HDD 114. An operating system (OS) unit 208 adjusts each module and task to manage the entire software of the MFP 100. A device driver unit 207 is combined with the OS unit 208. The device driver unit 207 controls hardware devices, such as the scanner 122, the modem 123, the RAM 113, and the HDD 114.

FIG. 4 is a block diagram illustrating a configuration of the external apparatus 300 illustrated in FIG. 1.

Referring to FIG. 1, a control unit 310, which includes a CPU 311, controls the overall operation of the external apparatus 300, such as a PC. The CPU 311 reads out control programs stored in a memory 312 or an HDD (not illustrated) to perform various control operations. The memory 312 is also used as a temporary storage region, such as a main memory or a work area, for the CPU 311. Furthermore, the external apparatus 300 is configured in such a manner that a single CPU 311 performs each processing using a single memory 312, but may be configured in other manners.

For example, the external apparatus 300 may be configured in such a manner that a plurality of CPUs and a plurality of memories perform each processing in cooperation with each other.

An operation unit I/F 313 connects an operation unit 320 to the control unit 310. The operation unit 320 is equipped with a liquid crystal display unit having a touch panel function and a keyboard, and serves as a reception unit that receives an operation, an input, and an instruction from the user. A network I/F 314 connects the control unit 310 (the external apparatus 300 such as a PC) to a wired LAN. The external apparatus 300 such as a PC is able to transmit image data or information and receive various pieces of information via the network I/F 314.

Figure 5A:
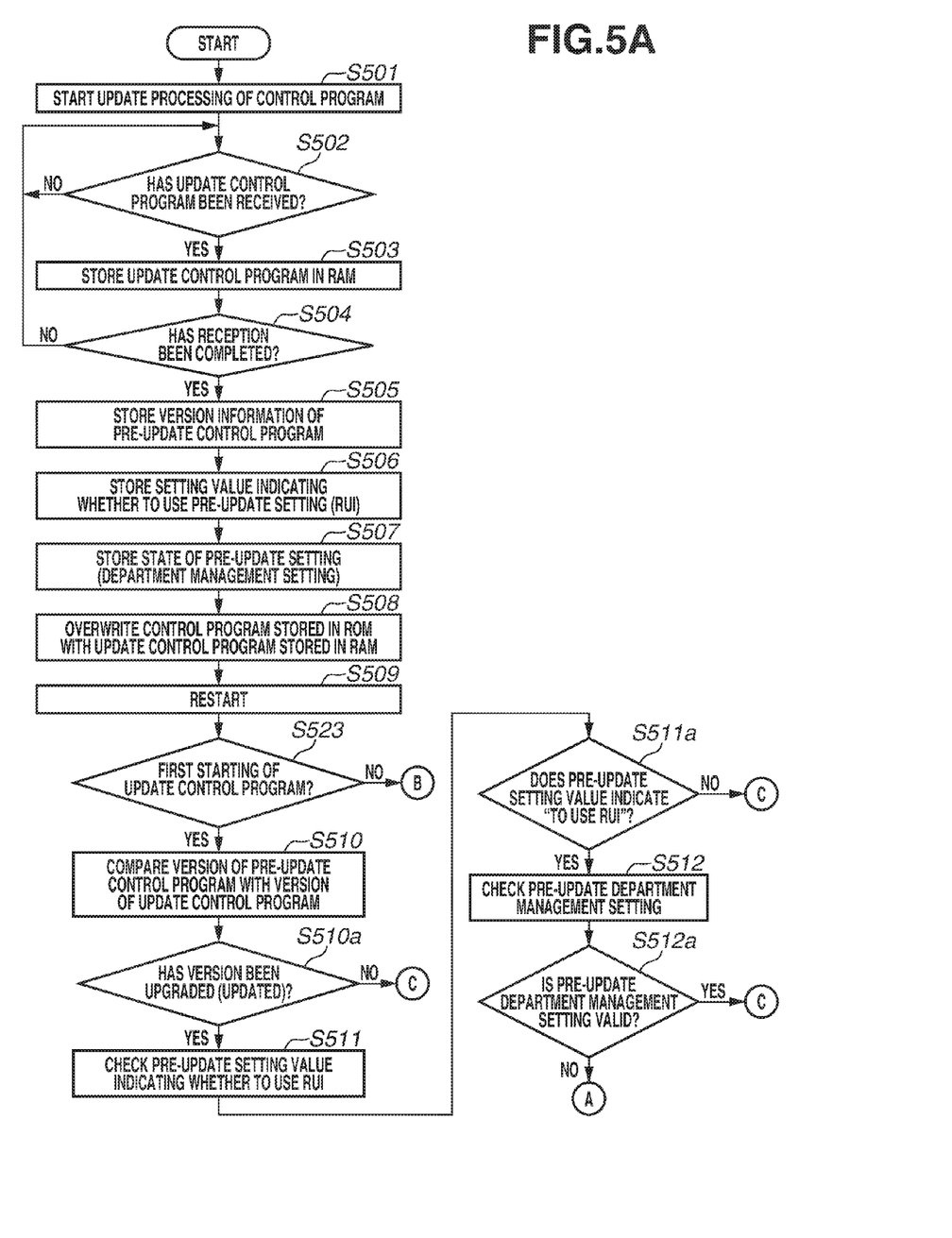
FIGS. 5A and 5B are flowcharts illustrating a control method for the information processing apparatus.
Figure 5B:
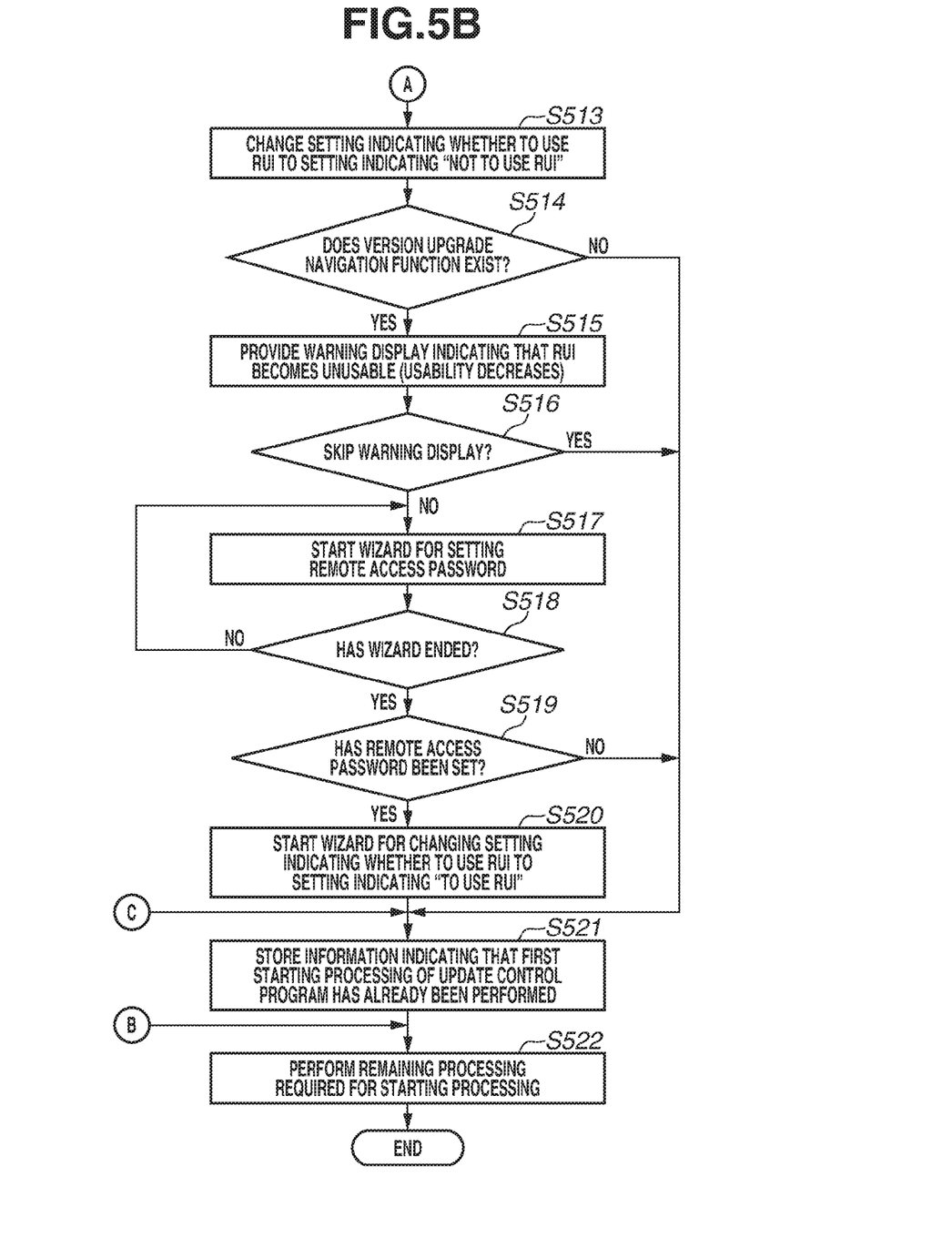

FIGS. 5A and 5B are flowcharts illustrating a control method for the information processing apparatus according to the present exemplary embodiment. The control method in the present exemplary embodiment is an example of processing for updating a control program that is executed in the MFP 100 illustrated in FIG. 1. Furthermore, each operation (step) in the flowcharts illustrated in FIGS. 5A and 5B is implemented by the CPU 111 of the control unit 110 executing a control program stored in the ROM 112 and an update control program, which is obtained by overwriting a control program stored in the ROM 112 and storing the overwritten control program.

In step S501, in response to an operation on the operation unit 120, the CPU 111 starts update processing of a control program that is executed in the MFP 100. After the update processing of the control program (control information) is started, then in step S502, the CPU 111 comes into a reception waiting state for acquiring an update control program (updated firmware), which is transmitted from the external apparatus 300, such as a PC, via the wired LAN and the network I/F 119.

When, in this reception waiting state, the MFP 100 receives the update control program transmitted from the external apparatus 300, such as a PC, the processing proceeds to step S503. In step S503, the CPU 111 stores the received update control program in the RAN 113. In step S504, the CPU 111 determines whether the update control program has been completely received to the end of data thereof. If the CPU 111 determines that the update control program has not yet been received to the end of data thereof (NO in step S504), the processing returns to step S502.

Furthermore, in step S504, since error processing performed in a case where the reception of the update control program is failed does not affect the effect of the present invention, the description thereof is omitted.

On the other hand, if, in step S504, the CPU 111 determines that the update control program has been completely received to the end of data thereof (YES in step S504), the processing proceeds to step S505. In step S505, the CPU 111 stores the version information of a control program that is to be updated, in preparation for starting of the update control program, which is executed later. In step S506, the CPU 111 stores a setting value indicating whether to use a remote user interface (RUI) that is set in the MFP 100 at that point of time. Here, the MFP 100 is configured in such a manner that, if "not to use the RUI" is set in the setting value indicating whether to use the RUI, the MFP 100 inhibits an access using a web browser from an external apparatus such as a client device.

In step S507, the CPU 111 stores the state of a department management setting (a setting value indicating whether the department management setting is valid or invalid) that is set in the MFP 100 at that point of time.

In the present exemplary embodiment, the department management setting refers to a setting for performing control such that a login identifier (ID) and a password are set for each user who uses the MFP 100 and, when the login. ID and the password are set "valid", it is necessary for the user to correctly enter the set login ID and password when the user actually uses (operates) the MFP 100. Furthermore, the department management setting can be similarly set even in the case of an access to the MFP 100 using the RUI with a web browser.

Next, in step S508, the CPU 111 overwrites a control program, which is stored in the ROM 112 and is being currently executed, with the update control program, which has been stored in the RAM 113. Then, in step S509, the CPU 111 restarts the MFP 100. Restarting of the MFP 100 results in the update control program, which has been stored in the ROM 112 by updating, being executed by the CPU 111.

Accordingly, each operation (step) performed after step S509 is implemented by the CPU 111 of the control unit 110 executing the update control program stored in the ROM 112.

First, in step S523, the CPU 111 determines whether the processing performed at the time of the current starting is processing performed when the update control program has been first executed. Furthermore, to make such a determination, the CPU 111 checks the state of a flag that is provided at a specific location of the ROM 112 to indicate that the processing at the time of the first starting of the update control program has already been performed.

For example, if the flag is not set, the CPU 111 determines that the processing at the time of the first starting of the update control program has not yet been performed (the processing at the time of the first starting following step S510 is to be performed after this).

If, in step S523, the CPU 111 determines that the processing performed at the time of the current starting is not processing performed when the update control program has been first executed, in other words, if the CPU 111 determines that the processing performed at the time of the current starting is processing performed at the time of ordinary turning-on of power (NO in step S523), the processing proceeds to step S522. On the other hand, if, in step S523, the CPU 111 determines that the processing performed at the time of the current starting is processing performed when the update control program has been first executed (YES in step S523), the processing proceeds to step S510.

In step S510, the CPU 111 makes a comparison between the version information of the control program that has been stored in the RAN 113 in step S505 (hereinafter referred to as a "pre-update control program" for ease of description) and the version information of the update control program, which is the control program updated in step S508, and, in step S510a, determines whether the version of the control program has been updated (upgraded).

For example, if the CPU 111 determines that the version of the pre-update control program and the version of the update control program are the same or the version of the update control program is lower (older) than the version of the pre-update control program (NO in step S510a), the processing proceeds to step S521.

On the other hand, if, in step S510a, the CPU 111 determines that the version of the control program has been updated (upgraded) (YES in step S510a), the processing proceeds to step S511. In step S511, the CPU 111 checks the setting value indicating whether to use the RUI, which has been stored in the RAM 113 in step S506. Then, in step S511a, the CPU 111 determines whether the setting value indicates "to use the RUI". If, in step S511a, the CPU 111 determines that the setting value indicates "not to use the RUI" (NO in step S511a), the processing proceeds to step S521.

On the other hand, if, in step S511a, the CPU 111 determines that the setting value indicates "to use the RUI" (YES in step S511a), the processing proceeds to step S512. In step S512, the CPU 111 checks the setting value indicating whether the department management setting is valid or invalid, which has been stored in the RAM 113 in step S507. Then, in step S512a, the CPU 111 determines whether the setting value indicating the department management setting is valid. If the CPU 111 determines that the setting value indicating the department management setting is valid (YES in step S512a), the processing proceeds to step S521. Here, the setting value being "valid" represents a restriction being imposed on the use of the RUI.

On the other hand, if, in step S512a, the setting value indicating the department management setting is invalid (NO in step S512a), the processing proceeds to step S513. In step S513, the CPU 111 changes the setting indicating whether to use the RUI or not to the setting indicating "not to use the RUI".

Next, in step S514, the CPU 111 determines whether a version upgrade navigation exists as one of functions that belong to the update control program. Here, the version upgrade navigation is processing for prompting the user to change some settings in the MFP 100 when the update control program is started, to prevent the usability of the MFP 100 from becoming lower than that in the state where the pre-update control program is executed. In the present exemplary embodiment, steps S516 to S520, which are described below, correspond to processing for the version upgrade navigation.

Furthermore, the method for checking the existence of the version upgrade navigation in step S514 may be any methods, which include, for example, the update control program being previously provided with a flag indicating the existence or nonexistence of the version upgrade navigation.

If, in step S514, the CPU 111 determines that the version upgrade navigation does not exist in the update control program (NO in step S514), the processing proceeds to step S521.

Figure 6:
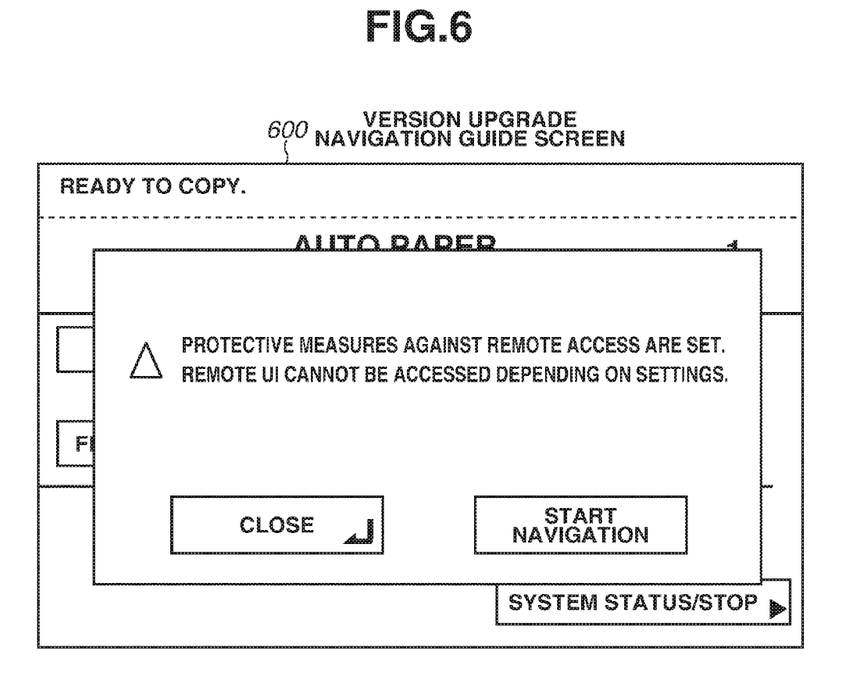
FIG. 6 illustrates a user interface (UI) screen that is displayed on the information processing apparatus.

On the other hand, in step S514, the CPU 111 determines that the version upgrade navigation exists in the update control program (YES in step S514), the processing proceeds to step S515. In step S515, the CPU 111 provides a warning display using an operation screen, such as a version upgrade navigation guiding screen 600 illustrated in FIG. 6, on the operation unit 120. This issues a warning notification indicating that the RUI may have become unusable and also displays a message for guiding the user to the version upgrade navigation to release the restriction on the RUI. This message indicates that to use the UI screen, it is necessary to enter authentication information.

In step S516, when detecting a "CLOSE" button on the screen displayed on the operation unit 120 having been pressed, the CPU 111 skips the version upgrade navigation. Similarly, in step S516, when detecting a "START NAVIGATION" button on the screen displayed on the operation unit 120 having been pressed, the CPU 111 advances the processing to step S517.

In step S517, the CPU 111 displays, on the operation unit 120, a wizard-type screen to allow the user to set a remote access password, thus having the user set the remote access password. In step S518, the CPU 111 determines whether the wizard for setting the remote access password has ended. If the CPU 111 determines that the wizard has ended (YES in step S518), the processing proceeds to step S519.

Here, the remote access password is described with reference to UI screens illustrated in FIG. 7.

As described in the foregoing, the function capable of allowing a client device such as a PC to view and alter the settings of the MFP 100 using a web browser is the RUI.

Figure 7:
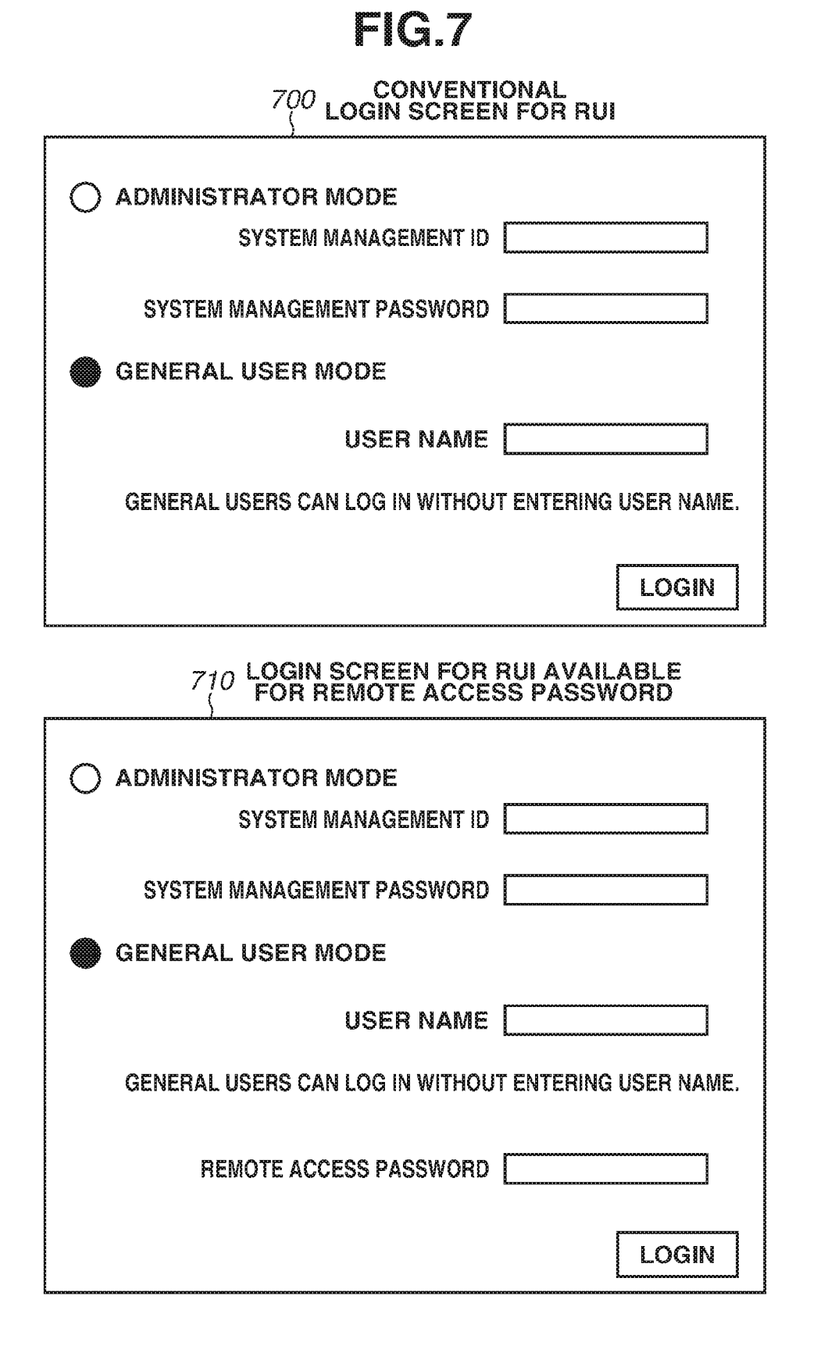
FIG. 7 illustrates a UI screen that is displayed on the information processing apparatus.

Furthermore, a conventional login screen that is first displayed on the web browser when the web browser accesses the MFP 100 is a screen such as that 700 illustrated in FIG. 7.

Referring to FIG. 7, on the screen. 700, the user selects a mode to be used for login (an administrator mode or a general user mode) with a radio button (○) at the left side of the screen, and then presses a "LOGIN" button at the lower right side of the screen, thus performing login.

Here, in a case where the user selects the administrator mode, login is enabled when the user enters both a system management ID and a system management password and the system management ID and the system management password are identical with those registered in the MFP 100.

On the other hand, in a case where the user selects the general user mode on the screen 700, login is enabled without the need of any specific entry.

Furthermore, the screen 700 represents a screen displayed when the user performs login in the general user mode. Unlike the above-mentioned conventional example screen, the present exemplary embodiment provides a login screen that requires the entry of a password even in a case where the user performs login in the general user mode and that enables login only when the password is identical with a password registered in the MFP 100. The password that is used in this instance is referred to as a "remote access password".

Referring to FIG. 7, a screen 710, which is a screen that is used when the user performs login in the general user mode, is provided with an entry area for the remote access password at the lower portion of the screen. Only when the remote access password that the user has entered in the entry area for the remote access password is identical with a password registered in the MFP 100, login is enabled.

Furthermore, a single remote access password is set for each MFP, so that any general users can perform login with the same remote access password.

Next, wizard-type UI screens displayed in step S517 are described with reference to FIG. 8.

First, the CPU 111 displays a screen 800 to provide an explanation about the remote access password, thus having the user determine whether to really perform the setting.

When the user presses a "NO" button on the screen 800, the CPU 111 changes the displayed screen to a screen 830. When the user presses a "YES" button on the screen 800, the CPU 111 changes the displayed screen to a screen 810.

When the user enters the remote access password on the screen 810 and presses an "ENTER" button, the CPU 111 changes the displayed screen to a screen 820 to have the user re-enter the remote access password.

When the user presses an "ENTER" button after re-entering the remote access password on the screen 820, the CPU 111 determines whether the value of the remote access password entered on the screen 810 is identical with the value of the remote access password entered on the screen 820.

If the CPU 111 determines that the two values are identical, the CPU 111 stores the confirmed remote access password in the RAM 113 and changes the displayed screen to the screen 830. On the other hand, if the CPU 111 determines that the two values are not identical, the CPU 111 displays a screen 840 for a predetermined time and then changes the displayed screen to the screen 810.

Figure 8:
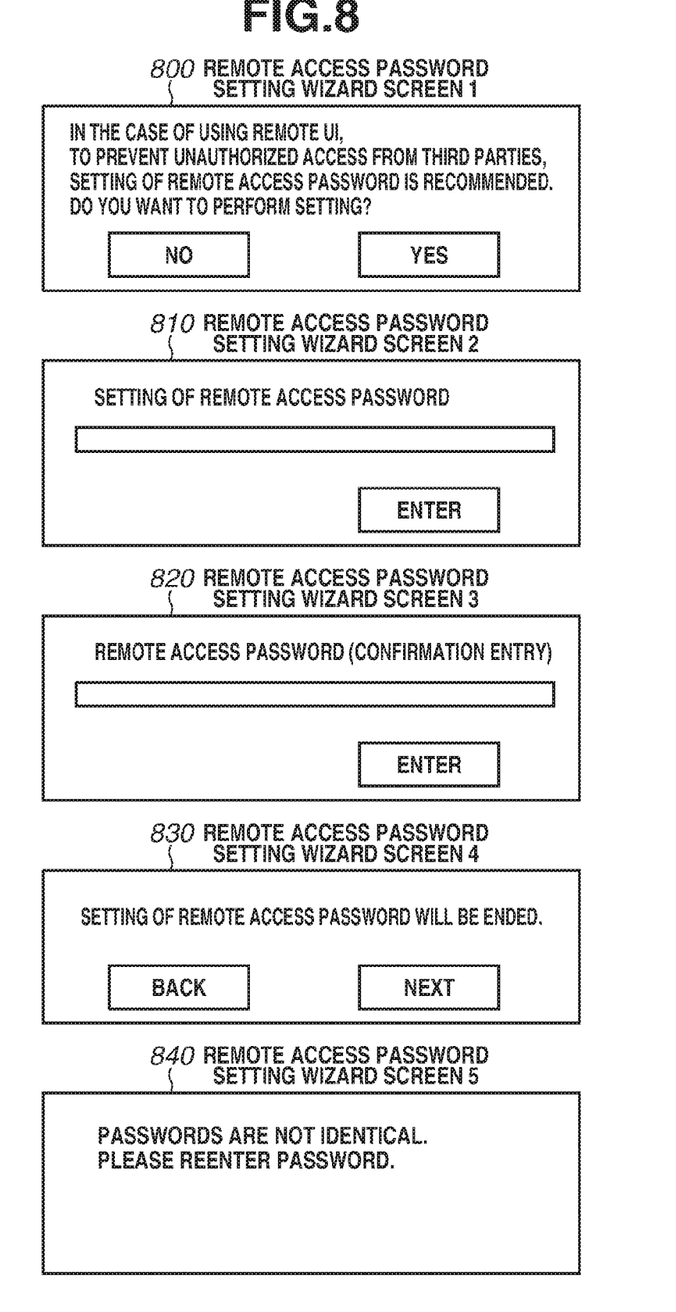
FIG. 8 illustrates a UI screen that is displayed on the information processing apparatus.

Furthermore, the screen 830 illustrated in FIG. 8 corresponds to a screen displayed when processing in step S518 is performed in the flowcharts of FIGS. 5A and 5B.

In step S518, the CPU 111 determines whether the wizard for setting the remote access password has ended. If the CPU 111 determines that the wizard has ended (YES in step S518), the processing proceeds to step S519. Here, the detection of the end of the wizard is performed based on whether the user presses a "NEXT" button on the screen 830.

Then, in step S519, the CPU 111 determines whether the remote access password has been set by the wizard for setting the remote access password, based on the content stored in the RAM 113. If the CPU 111 determines that the remote access password has been set (YES in step S519), the processing proceeds to step S520. In step S520, the CPU 111 starts a wizard for changing the setting indicating whether to use the RUI to the setting indicating "to use the RUI".

If, in step S519, the CPU 111 determines that the remote access password has not been set (NO in step S519), the CPU 111 ends the version upgrade navigation and advances the processing to step S521.

Furthermore, since any type of the wizard used in step S520 does not affect the effect of the present invention, the detailed description thereof is omitted.

Then, in step S521, the CPU 111 records, on the ROM 112, information indicating that the first starting processing of the update control program has already been performed. In other words, the CPU 111 changes the state of the flag used for confirmation in step S523 described above to the set state.

Since the state of the flag is changed to the set state in this way, at the time of the next turning-on of power of the MFP 100, the CPU 111 can omit the processing in step S510 to step S520. In subsequent step S522, the CPU 111 performs remaining processing required for starting of the update control program.

When the starting processing has been completed, the MFP 100 comes into a normal operation state, so that the MFP 100 can perform various original processing operations, such as transmission and reception of facsimile data.

According to the present exemplary embodiment, even if the pre-update control program has a setting that may cause such a security problem that personal data becomes fully exposed to view from the outside, that setting can be changed to a setting that does not cause the problem, at the timing when the pre-update control program has been updated to the update control program, without the decrease of usability.

In the above-described first exemplary embodiment, in step S512, the CPU 111 checks the setting value indicating whether the department management setting is valid or invalid. Then, if the setting value indicating the department management setting is valid, the processing proceeds to step S521.

On the other hand, in a second exemplary embodiment of the present invention, the values of a system management ID and a system management password are also previously stored in addition to the above-mentioned setting value before updating of the control program. Then, at the time of starting of the update control program, in step S512, the CPU 111 compares the values of the system management ID and the system management password between the pre-update control program and the update control program. The system management ID and the system management password are values that the user enters when the administrator mode has been selected with the radio button (o) at the left side of the login screen for the RUI illustrated in FIG. 7.

Then, if, as a result of comparison in step S512, the CPU 111 determines that the values of the system management ID and the system management password have not been updated from those in a default setting of the MFP 100, the processing proceeds to step S513.

Furthermore, the wizard in step S517 can be used to not only set the remote access password but also change the values of the system management ID and the system management password to values other than those in the default setting.

According to the second exemplary embodiment, even if there is a security problem with access to the RUI in the administrator mode, the control program is updated to the update control program. This enables changing the MFP 100 to a setting environment involving no security problem without decreasing usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-067937 filed Mar. 30, 2015, which is hereby incorporated by reference herein in its entirety.

What is claimed is:

1. An information processing apparatus comprising: a memory; a processor coupled to the memory which updates firmware of the information processing apparatus; the processor configured to determine whether a setting regarding a remote access service provided by the information processing apparatus has been enabled due to the firmware being updated, wherein the information processing apparatus inputs a configuration remotely by using the remote access service; the processor configured to disable the enabled setting during the update of the firmware; a display unit configured to provide a message indicating that the setting regarding the remote access service is disabled due to the firmware being updated and guidance information indicating how to enable the remote access service;

wherein a warning display includes displaying a message indicating that the use of the particular function is restricted and a button that is operable to start a navigation for releasing the use of the particular function from being restricted; and the processor configured to receive setting of an access password with respect to the particular function after the navigation is started by the button being operated; and the processor configured to register the received access password set with respect to the particular function, wherein a remote user interface is enabled if the access password has been registered.

2. The information processing apparatus according to claim 1, wherein the particular function is a function to provide a remote user interface to a data processing apparatus.

3. A control method for an information processing apparatus, the control method comprising: updating firmware of the information processing apparatus; determining whether a setting regarding a remote access service provided by the information processing apparatus has been enabled due to the firmware being updated, wherein the information processing apparatus inputs a configuration remotely by using the remote access service; disabling the enabled setting during the update of the firmware; and causing a display unit to provide a message indicating that the setting regarding the remote access service is disabled due to the firmware being updated and guidance information indicating how to enable the remote access service;

wherein a warning display includes displaying a message indicating that the use of the particular function is restricted and a button that is operable to start a navigation for releasing the use of the particular function from being restricted; and the processor configured to receive setting of an access password with respect to the particular function after the navigation is started by the button being operated; and the processor configured to register the received access password set with respect to the particular function, wherein a remote user interface is enabled if the access password has been registered.

4. A non-transitory computer-readable storage medium storing computer-executable instructions that cause a computer to perform a control method for an information processing apparatus, the control method comprising: updating firmware of the information processing apparatus; determining whether a setting regarding a remote access service provided by the information processing apparatus has been enabled due to the firmware being updated, wherein the information processing apparatus inputs a configuration remotely by using the remote access service; disabling the enabled setting during the update of the firmware; and causing a display unit to provide a message indicating that the setting regarding the remote access service is disabled due to the firmware being updated and guidance information indicating how to enable the remote access service;

wherein a warning display includes displaying a message indicating that the use of the particular function is restricted and a button that is operable to start a navigation for releasing the use of the particular function from being restricted; and the processor configured to receive setting of an access password with respect to the particular function after the navigation is started by the button being operated; and the processor configured to register the received access password set with respect to the particular function, wherein a remote user interface is enabled if the access password has been registered.

* * * * *